(12) United States Patent
Pettesch

(10) Patent No.: US 6,536,744 B1
(45) Date of Patent: Mar. 25, 2003

(54) FUEL DISPENSER BUMPER GUARD DISPLAY ASSEMBLY

(75) Inventor: Martin C. Pettesch, Cranford, NJ (US)

(73) Assignee: Technalink, Inc., Cranford, NJ (US)

( * ) Notice: Subject to any disclaimer, the term of this patent is extended or adjusted under 35 U.S.C. 154(b) by 0 days.

(21) Appl. No.: 09/333,230

(22) Filed: Jun. 14, 1999

(51) Int. Cl.[7] .............................. G09F 15/00; F16L 5/00; F16L 3/24
(52) U.S. Cl. ............................. 256/1; 40/606; 40/607; 40/612; 248/56; 248/72; 403/234; 403/213
(58) Field of Search ........................ 40/606, 607, 612; 248/56, 72; 403/234, 235, 236, 237, 232.1, 230, 256, 213; 256/1, 13.1

(56) References Cited

U.S. PATENT DOCUMENTS

| 1,756,389 | A | | 4/1930 | Schneider | 248/163.2 |
|---|---|---|---|---|---|
| 1,828,239 | A | | 10/1931 | Bennett et al. | 40/606 |
| 2,142,571 | A | * | 1/1939 | Menke | |
| 2,388,180 | A | | 10/1945 | Pulver, Jr. | 40/606 |
| 2,515,818 | A | | 7/1950 | Bennett et al. | 40/606 |
| 2,533,778 | A | | 12/1950 | Eckhardt | 40/734 |
| 2,550,001 | A | * | 4/1951 | Button | |
| 3,604,676 | A | * | 9/1971 | Weber | |
| 3,685,184 | A | | 8/1972 | Snyder, Jr. | 40/609 |
| D234,231 | S | | 1/1975 | Alfonso | D20/10 |
| 3,958,351 | A | * | 5/1976 | Summey | |
| 4,138,787 | A | | 2/1979 | Sarkisian et al. | 40/618 |
| 4,145,828 | A | * | 3/1979 | Hillstrom | |
| 4,265,040 | A | | 5/1981 | Sarkisian | 40/618 |
| 4,341,029 | A | * | 7/1982 | Heard | |
| D271,218 | S | | 11/1983 | Farmer | D20/10 |
| D275,579 | S | | 9/1984 | Brown et al. | D20/10 |
| 4,519,152 | A | | 5/1985 | Seely et al. | 40/156 |
| 4,523,400 | A | | 6/1985 | Seely | 40/156 |
| D281,324 | S | | 11/1985 | Badgley | D15/9.2 |
| 4,580,361 | A | | 4/1986 | Hillstrom et al. | 40/603 |
| 4,592,530 | A | | 6/1986 | Seely et al. | 248/475.1 |
| 4,609,183 | A | * | 9/1986 | Ulmer | 256/1 |
| 4,756,107 | A | | 7/1988 | Hillstrom | 40/603 |
| 4,937,959 | A | | 7/1990 | Palmer et al. | 40/156 |
| 4,958,458 | A | | 9/1990 | Hillstrom et al. | 40/156 |
| 5,040,586 | A | | 8/1991 | Hillstrom | 160/383 |
| 5,076,736 | A | | 12/1991 | Grewe et al. | 403/295 |
| D327,096 | S | | 6/1992 | Hobbs | D20/10 |
| 5,307,575 | A | | 5/1994 | Ivansson et al. | 40/156 |
| 5,408,774 | A | | 4/1995 | Grewe et al. | 40/606 |
| 5,428,913 | A | | 7/1995 | Hillstrom | 40/604 |
| 5,553,360 | A | * | 9/1996 | Lucas et al. | |
| 5,605,414 | A | * | 2/1997 | Fuller et al. | 40/607 |

* cited by examiner

Primary Examiner—Lynne H. Browne
Assistant Examiner—Ernesto Garcia
(74) Attorney, Agent, or Firm—Edward Dreyfus, Esq.

(57) ABSTRACT

A displaying bumper guard for fuel dispensers that includes a sign-holding frame assembly mounted on an inverted U-shaped bumper guard member with the bumper guard legs imbedded in the ground level concrete or concrete ledge. The device includes a frame for supporting a sign and a mounting assembly for securing the frame to the bumper guard member. The visual square footage of the frame, viewed normally thereto, is much larger than that of the bumper guard member thus providing a good visual barrier for the dispensers. In one exemplary embodiment, the bracket assembly is releasably secured to the center leg of the guard member and includes at least one and preferably two displaced mounting surface located a short distance from the side profile of the bumper guard member. The frame includes at least one and preferably two spaced elongated reinforcement frame rails or bars secured to the frame sides to strengthen the frame and to cooperate with the mounting surface by being releasably secured thereto. When installed, the bottom of the frame is preferably spaced above the supporting concrete surface to allow wind to pass below the frame as well as around and over it.

16 Claims, 6 Drawing Sheets

FUEL DISPENSER BUMPER GUARD DISPLAY ASSEMBLY

BACKGROUND

The present invention relates to fuel dispenser bumper guards and, more particularly, (i) to a novel bumper guard that includes, in combination, a display apparatus and (ii) to a display apparatus that can be retrofitted or installed in combination with existing bumper guards.

As generally known, fueling stations, such as gasoline stations, normally include below ground fuel storage tanks and above ground fuel dispensers. The latter includes pumps, valves, hose lines and various mechanical and electrical devices for delivering and controlling volatile liquid and vapor fuel to stationary vehicles. During the last 15 years, regulatory agencies required dispensers to be mounted on concrete platforms with outer peripheries greater than that of any dispenser equipment in order to provide some protection against dispensers from being hit by vehicles entering or leaving the fueling area. In addition, inverted U-shaped bumper guards made of high impact resistant steel pipe sections have their legs imbedded in the concrete a few feet in the longitudinal direction of each of the outermost dispensers. These bumper guards provide a strong physical barrier against impact by vehicles that may inadvertently drive headlong or back into a dispenser. However, these guards provide a poor visual barrier since they are simply an exposed pipe section.

Managers of modern gas stations, particularly in urban and suburban settings, finding themselves in a competitive market, use a variety of visual signs and displays to attract customers to come on to their station to purchase fuel. In addition, signs and displays are used to announce prices, specials, and a variety of products and services offered at the gas station. Accordingly, there has been a sharp increase in free standing signs and displays placed on the property of gas stations. These displays generally include a multi-footed stand that supports an upstanding sign. These free standing devices create problems because of their tendency to blow over or slide out of position under certain wind conditions, thus becoming hazards to those vehicle operators entering or leaving the fuel station.

SUMMARY OF EXEMPLARY EMBODIMENTS OF PRESENT INVENTION

Bumper guards, according to the principles of the present invention, solve the foregoing problems and provide other benefits as well. In one exemplary embodiment, when installed, a bumper guard includes a display assembly mounted on an inverted Ushaped bumper guard member with the bumper guard legs imbedded in the ground level concrete or concrete ledge, a display device having a frame for supporting a sign or other display, and a mounting assembly for securing the frame to the bumper guard member. Preferably the frame completely surrounds the sign and the visual square footage of the frame, viewed normally thereto, is much larger than that of the bumper guard member thus providing a good visual barrier for the dispensers as described above. The bumper guard remains stationary under substantially all wind conditions.

In one exemplary embodiment, the bracket assembly is releasably secured to the center leg of the guard member and includes at least one and preferably two displaced mounting surfaces located a short distance from the side profile of the bumper guard member. The frame includes at least one and preferably two spaced elongated reinforcement frame rails or bars secured to the frame sides to strengthen the frame and to cooperate with the mounting surfaces by being releasably secured thereto. When installed, the vertical distance of the frame below the center portion of the bumper guard is preferably such that the frame bottom is spaced above the supporting concrete surface to allow wind to pass below the frame as well as around and over it. This feature will reduce the torque exerted by wind on the frame.

DRAWINGS

Other and further objects, benefits, and advantages afforded by bumper guards according to the present invention will become apparent with reading of the following detailed description of an exemplary embodiment when taken in view of the appended drawings, in which.

DETAILED DESCRIPTION OF EXEMPLARY EMBODIMENTS

Figure 1:
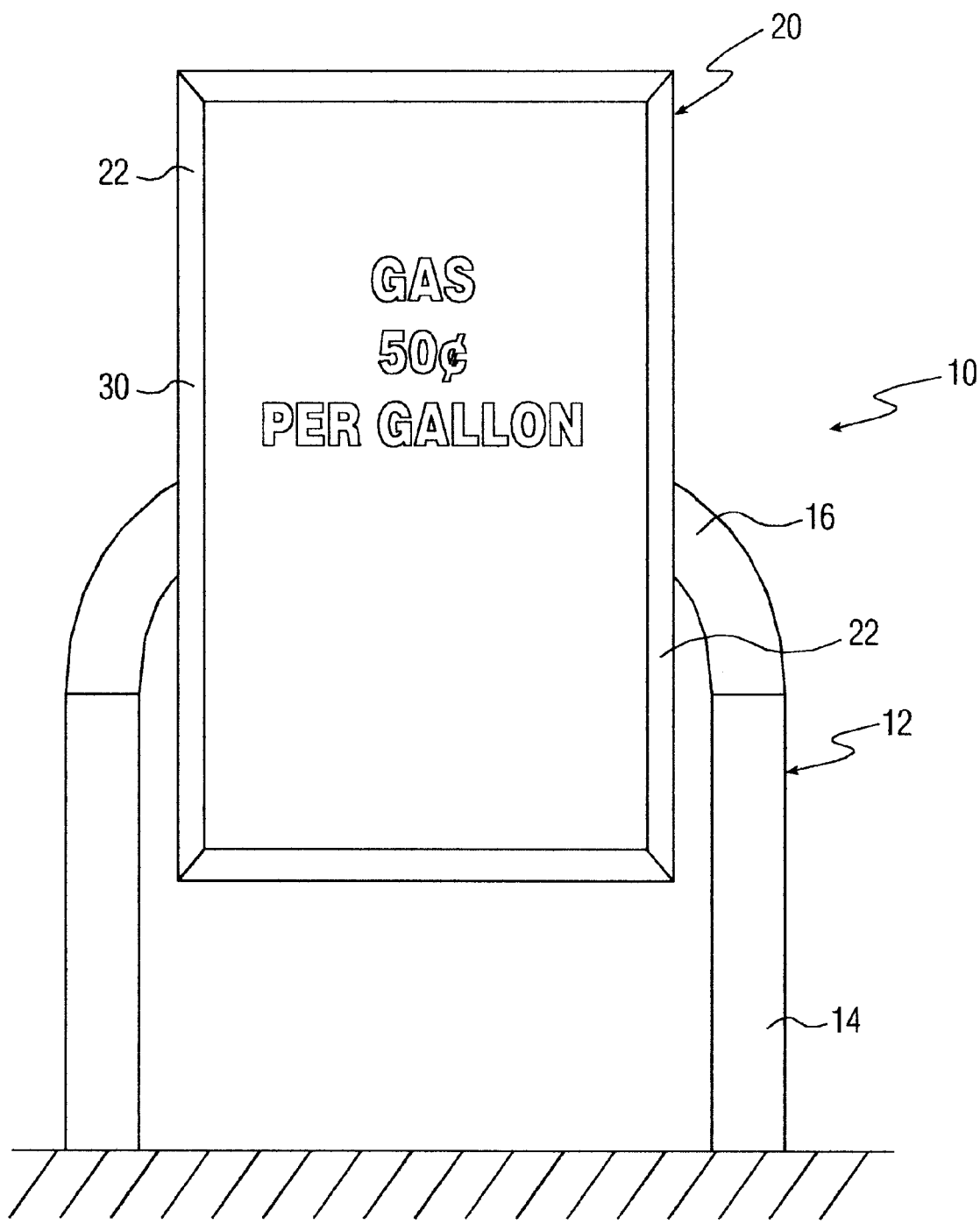
FIG. 1 is a front elevation view of one exemplary embodiment of a bumper guard according to the principles of the present invention.
Figure 2:
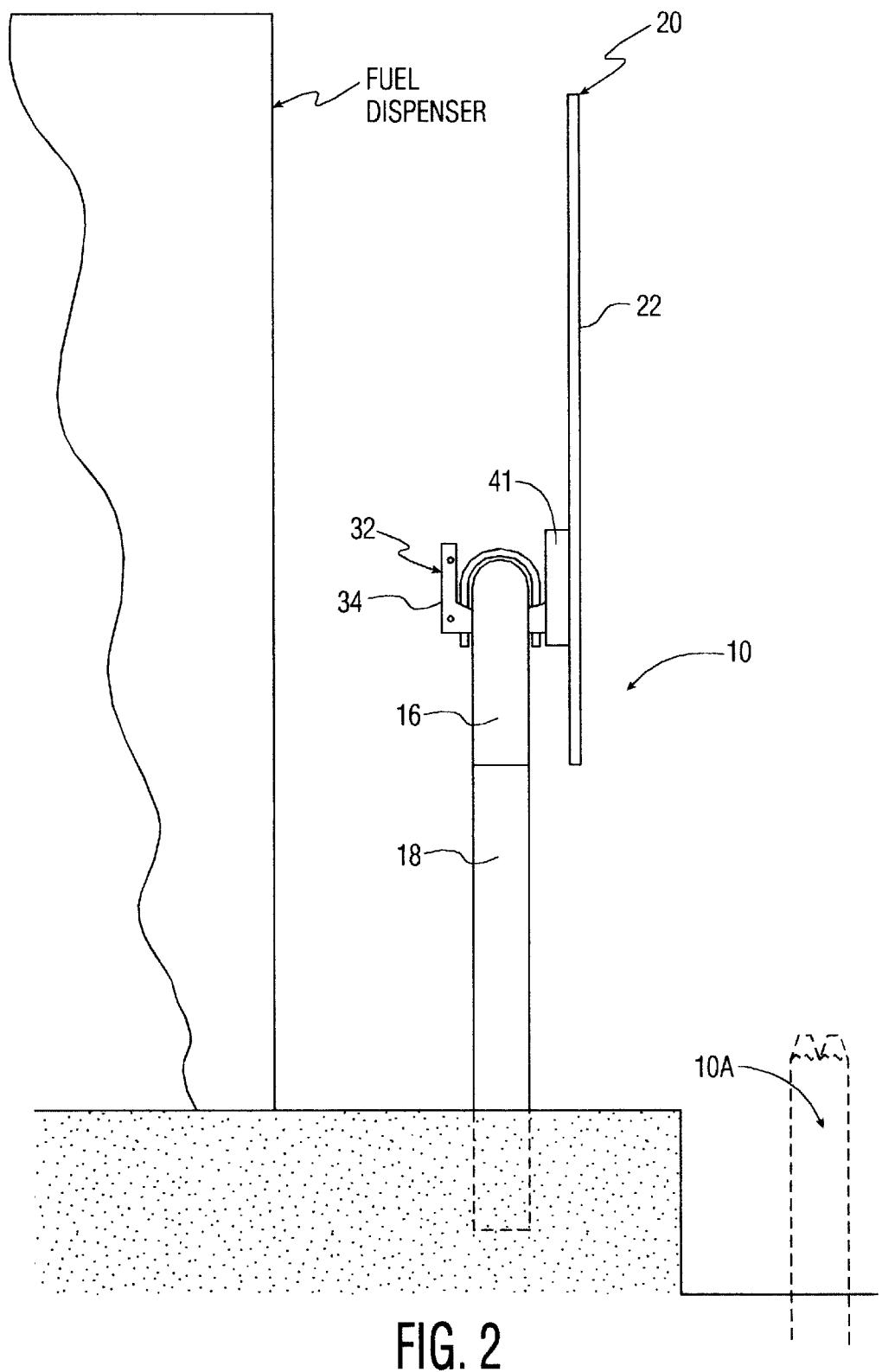
FIG. 2 is a side elevation view of FIG. 1.
Figure 3:
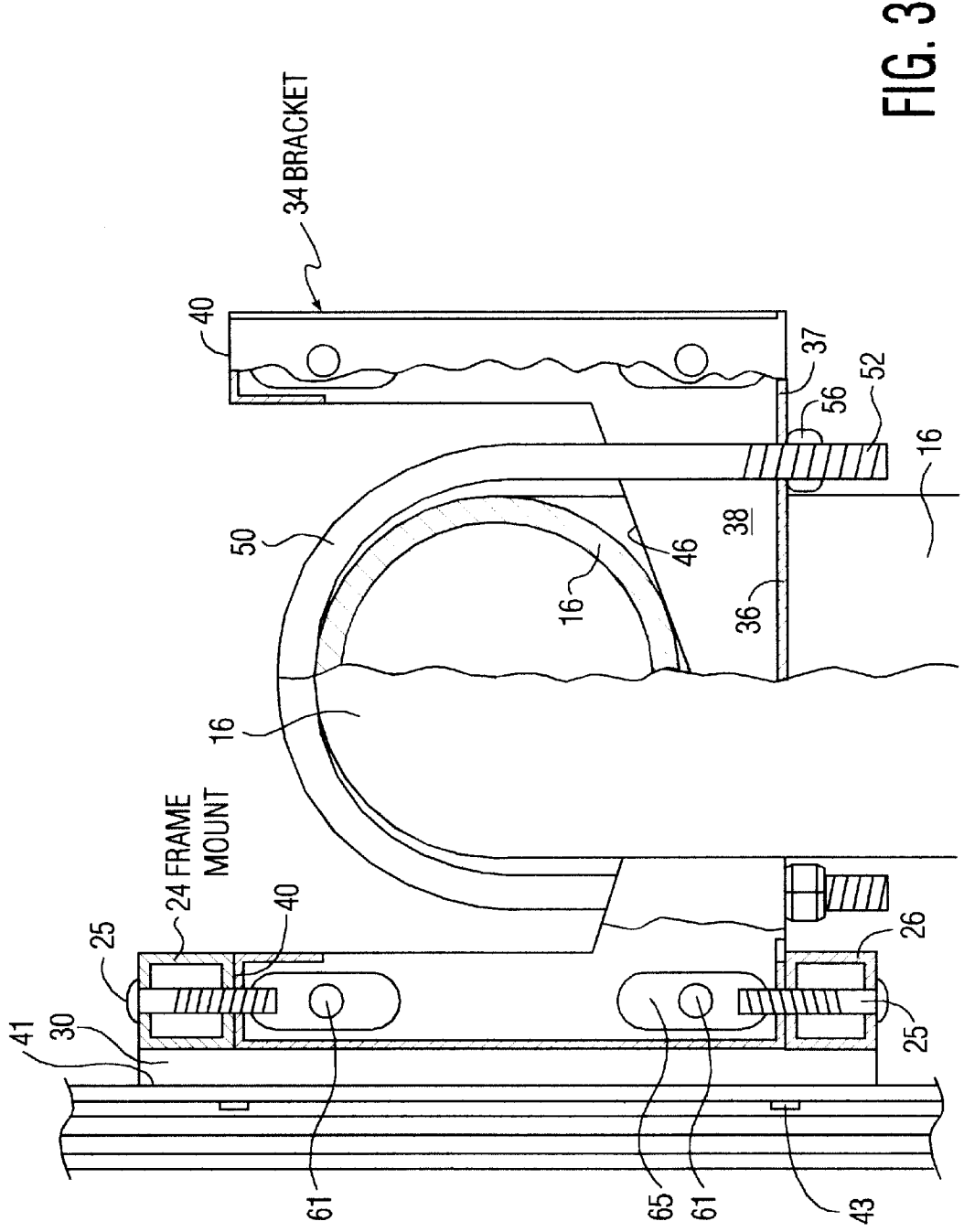
FIG. 3 is a partial side view of the bracket assembly, center frame portion, and upper bumper guard portion of FIG. 2 with parts broken away and shown in section.
Figure 4:
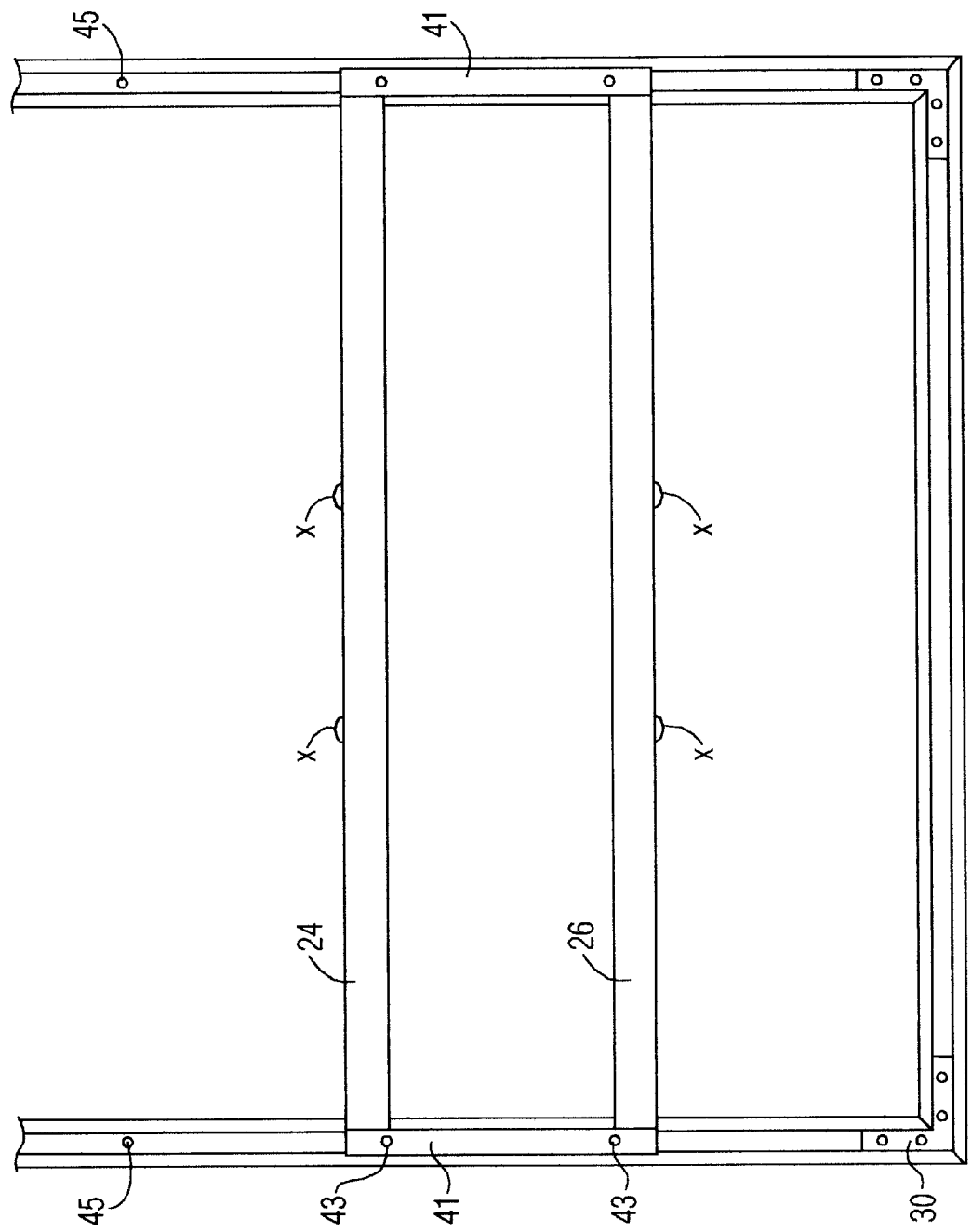
FIG. 4 is a rear view of the frame assembly of FIG. 1 before installation.
Figure 5:
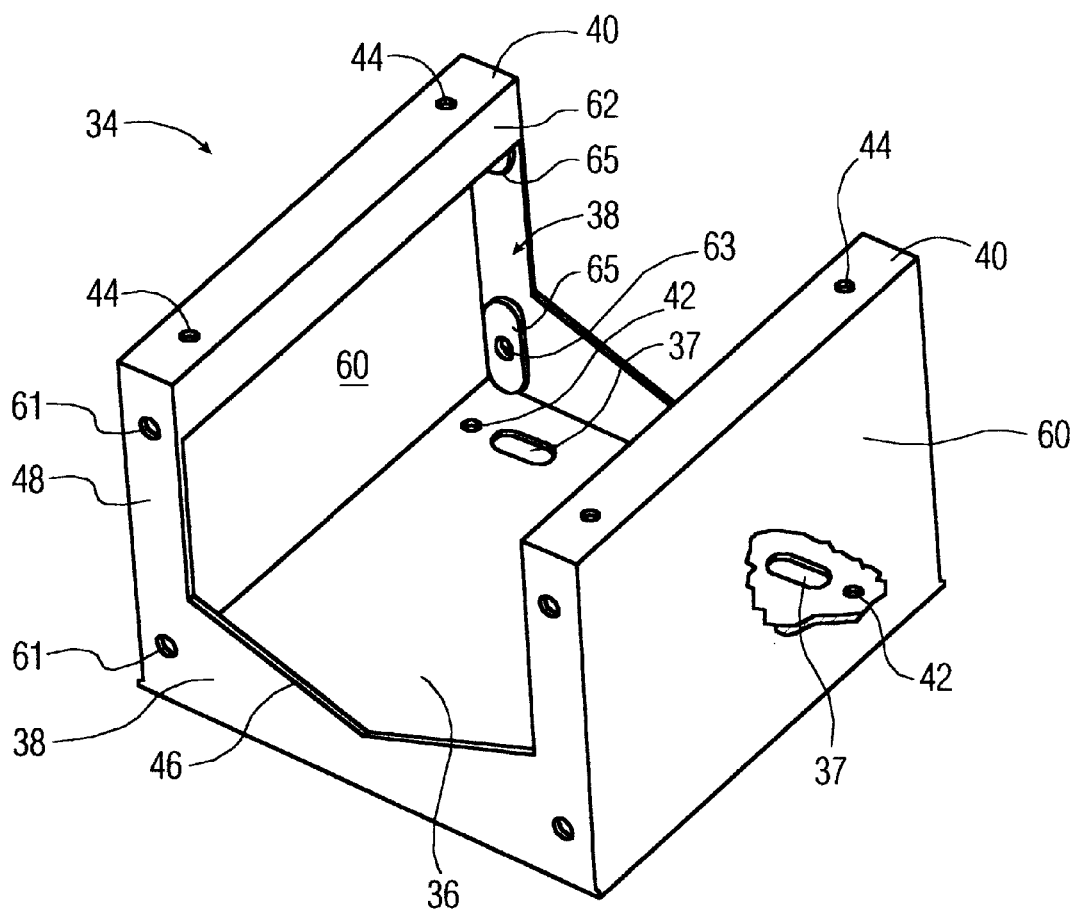
FIG. 5 is a perspective view of the bracket box of FIG. 1.
Figure 6:
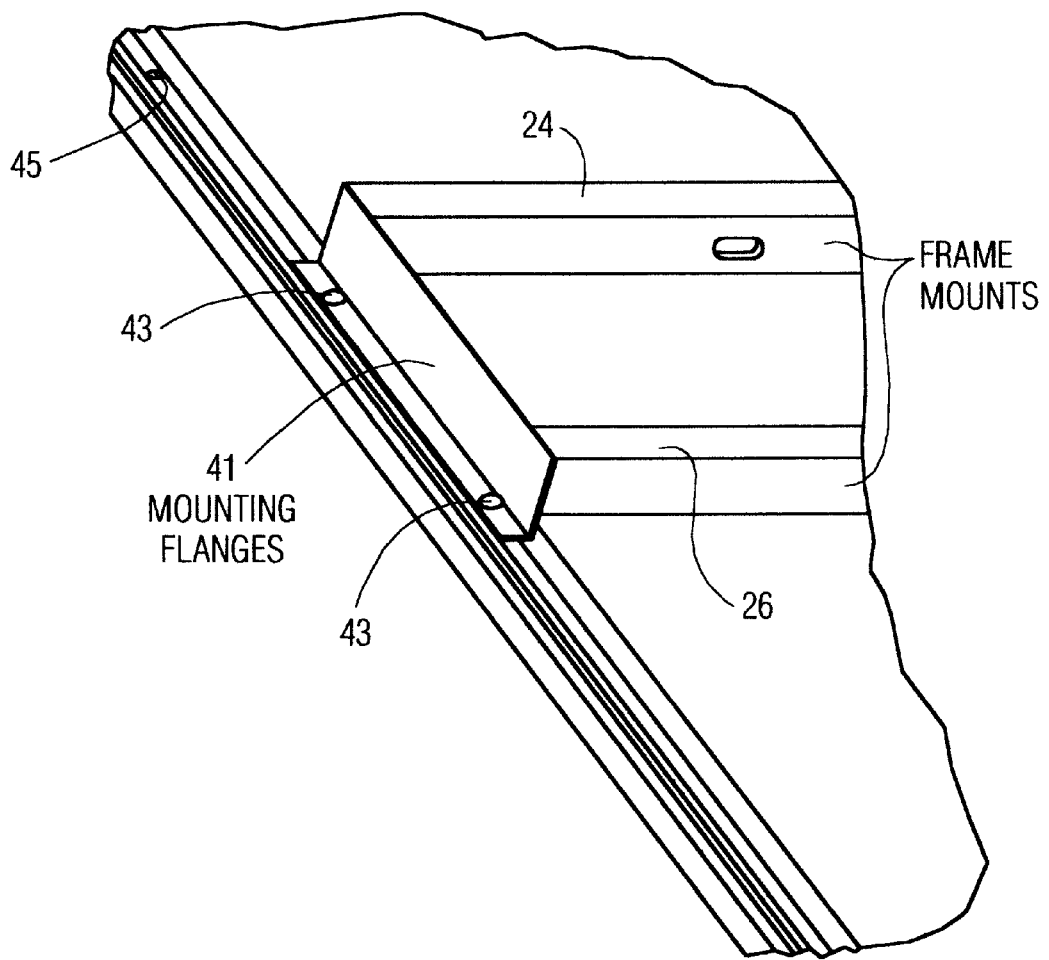
FIG. 6 is a partial perspective view of the flange, frame mounts, and rear of the frame side.

With reference to FIGS. 1–6, a displaying bumper guard 10 according to the principles of the present invention includes an inverted U-shaped bumper guard member 12 having a pair of upstanding legs 14 for embedding into a concrete foundation and a generally horizontal center leg or portion 16 welded or otherwise connected to the tops of legs 14 at seams 18. Legs 14 and 16 can be formed of any suitable materials and shapes to provide impact protection to dispensers as described above. One example finds legs 14, 16 typically made of 4 inch diameter steel or aluminum pipe, although rails, box girders, or other shapes can be used. One preferred location of guard 10 is on the concrete ledge that supports the dispenser, and another preferred alternate location is indicated for guard 10A shown in dashed lines in FIG. 2 ahead of but near the ledge.

Displaying bumper guard 10 further includes a frame assembly 20, preferably made of steel or aluminum, that includes, in this example, a rectangular frame member 22 that releasably secures about the edges and holds flush with its outwardly or forwardly directed face a sign, poster, or the like in an-upright display position generally as shown. The sign securing apparatus of frame 22 can be of any suitable form, such as that disclosed in U.S. Pat. No. 4,145,828 for releasably securing a sign within the frame. Frame assembly 20 further includes at least two reinforcing frame mounts 24 and 26 extending laterally across the rear side of and welded or otherwise secured to the L-shaped mounting flanges 41 that are releasably secured to the back side of the vertical frame sides 22. Vertical sides 22 can be provided with tapped or untapped holes 45 at various vertical locations to receive machine screws or bolts 43 to secure flanges 41 at predetermined vertical positions on frame assembly 20. The top and bottom sides can be reinforceably secured to vertical sides by L-shaped corner members 30 screwed thereto. In the example shown, frame mounts are welded to flanges 41 which, in turn, are screwed to the vertical sides 22 of frame 20 by machine screws 43. Frame mounts 24 and 26 preferably function to reinforce or strengthen frame assembly 20 and to cooperate with and secure to the bumper guard member 12 via the bracket assembly 32 as described below. Frame mounts can be made of steel or aluminum or other material and have any suitable cross section such as box girders (as shown), rails, flat bars, L-shaped bars, etc.

Bracket assembly 32 functions to secure the frame assembly 20 to, in this example, the horizontal portion of center leg 16 of guard member 12 and to hold the frame assembly upright regardless of adverse wind conditions. In this example, bracket assembly 32 includes a bracket 34 having a floor or bottom 36, opposite side walls 38 with upstanding arms 48, and a top center v-shaped edge 46. Walls 60 and inner walls 62 can be provided to strengthen the assembly. Bracket mounting surface 40 extends between the tops of arms 48. Bottom 36 is preferably provided with 4 elongated openings. Upper bracket mounting surface 40 and lower bracket mounting surface of bottom 36 are provided with threaded openings 42 and 44 to receive fasteners such as machine screws described below. It is preferred that bracket 34 elements 62, 40, 60, 36 be made from a metal (eg. aluminum) blank that is folded or bent into shape. Side walls 38 can then be seam welded at suitable locations to close the bracket into a strong, rigid object.

Installation of displaying bumper guard 10 will now be described. Bumper guard 10 is installed in the usual manner. Bracket 34 is placed such that the v-shaped edges 46 of side walls 38 engage the underside of the horizontal portion of center leg 16, with arms 48 in a substantially vertical position. A pair of U-bolts 50 are placed over center leg 16 with their threaded legs 52 extending through openings 37 of bottom 36. U-bolts 50 are then tightly secured by locking nuts 56 threaded onto threaded legs 52. As nuts 56 are tightened, center leg 16 is securely clamped between the center legs of U-bolts 50 and the V-shaped edge 46 of side walls 38.

Frame assembly 20 is then placed against bracket assembly 32 such that frame mounts 24 rest on upper bracket mounts 40 and frame mounts 26 position just below floor 36. Frame assembly 20 can be worked laterally until the openings in mounts 24, 26 align with those (44, 63) in bracket mounts 40 and floor 36. When so aligned, frame bolts or screws 25 can be threaded into openings 44 and 42 to secure frame mounts 24, 26 to bracket 34. It should be noted that the fit between bracket mount 40, floor 36 and frame mounts 24, 26 is snug to resist any play or loose fit between these parts. This prevents wobbling or loosening of the frame assembly and assures that any and all wind forces applied to frame assembly 20 are effectively transferred to and absorbed by the stationary bumper guard. Note also (FIG. 1) the bottom of frame assembly 20 is spaced suitably above ground or ledge level to permit wind under the assembly as well as around it.

In the event the user wishes to change the displayed sign, the user simply opens the four frame sides on the first or outwardly directed face, changes the sign sheet and re-closes the four sides to retain the sheet. If the frame becomes damaged, eg. due to impact, or a different sized sign sheet is to be displayed, bolts or screws 25 are released and a new frame assembly installed. If the user wishes to store or display a second frame assembly on the opposite side of the guard member, a second frame assembly (not shown) can be mounted and releasably secured on rearward support surfaces 40 of bracket assembly 32 in the same manner as described above.

Bracket assembly 32 can be installed on any existing bumper guard to convert it to a displaying bumper guard. If desired, bracket 34 can be welded to center legs 16 of new bumper guards as a permanent piece of the bumper guard. This would eliminate the need for U-bolts and related floor member openings 37. It will be also understood that frame mounts 24 and 26 could alternately extend in the vertical direction with bracket mounts alternately extending in the horizontal direction or with the side wall arms 38 functioning as the bracket mounts. Threaded openings 61 can be provided through the side walls, and arms 48 and strengthening tabs 65 can be provided for this latter purpose. Accordingly, the distance between holes 44 should be the same as the distance between holes 61 to match the distance between the mounting holes in the frame mounts.

It will be understood that other and further modifications and changes can be made to the herein disclosed exemplary embodiment without departing from the spirit and scope of the present invention.

I claim:

1. A displaying bumper guard assembly for fueling stations having at least one fuel dispenser, the displaying bumper guard assembly comprising:

a U-shaped guard member secured in fixed relation with the dispenser for providing impact protection to the dispenser and comprising a pair of spaced, upstanding legs having bottoms embedded through a surface and top portions positioned above said surface, a laterally extending center leg connected to the top portions of said upstanding legs, a substantially planar frame assembly having a first face for retaining a data bearing sign, a pair of spaced frame sides each located at an opposite side of said first face, and at least two vertically spaced frame mounts extending between and coupled to said frame sides, one of said frame mounts located completely above said center leg and the other of said frame mounts located completely below said center leg, and a bracket assembly rigidly coupled to said frame mounts at a location intermediate said frame sides and rigidly coupled to said central leg to support said frame assembly in an upright position such that each of said frame sides extend above and below said center leg and said first face faces away from said guard member and the dispenser, said first face having an upper potion extending above said center leg and said upstanding legs to provide visual protection for said guard member and the dispenser.

2. The displaying bumper guard assembly as set forth in claim 1 wherein the bottom of said first face is spaced above the surface in which the U-shaped guard member legs are embedded to reduce torque caused by wind on said sign.

3. A displaying bumper guard assembly as set forth in claim 1 wherein said bracket assembly is releasably secured to said center leg.

4. The displaying bumper guard assembly as set forth in claim 1 wherein said bracket assembly includes a bracket having at least one wall that engages said center leg at at least two radial positions and contacting said center leg at at least a third position, and a clamping member adjustably connected to said bracket to controllably clamp said central leg between said side wall and said clamping member.

5. The displaying bumper guard assembly as set forth in claim 4 wherein said bracket comprises two spaced side walls each having one edge shaped to engage said center leg.

6. The displaying bumper guard assembly as set forth in claim 5 wherein said clamping member comprises at least one U-bolt having a central portion for engaging said center leg and U-bolt legs being threaded and extending through a portion of said bracket, a tightening device threaded on each said U-bolt leg for engaging said bracket such that tightening said devices increases the clamping forces applied on said center leg by said U-bolt and said side walls.

7. The displaying bumper guard assembly as set forth in claim 5 wherein said edge is V-shaped.

8. The displaying bumper guard assembly as set forth in claim 1 wherein said bracket assembly comprises a bracket having at least one bracket mounting surface having a congruent shape to the shape of the surface of said at least one of said frame mounts, said bracket mounting surface and said at least one of said frame mounts being in mutual engagement when said frame assembly is mounted to said bracket assembly.

9. The displaying bumper guard assembly as set forth in claim 8 wherein said one of said at least one of said frame mounts is supported by said bracket mounting surface.

10. The displaying bumper guard assembly as set forth in claim 8 wherein said at least one of said frame mounts is releasably secured to said bracket mount by at least one fastener when installed.

11. The displaying bumper guard assembly as set forth in claim 8 wherein said bracket comprises at least two bracket mounting surfaces one mounting surface being completely above and the other mounting surface being completely below said center leg, each mounting surface respectively engaging one of said frame mounts.

12. The displaying bumper guard assembly as set forth in claim 11 wherein said respective frame mounts and bracket mounting surfaces are releasably secured together by fasteners when installed.

13. The displaying bumper guard assembly as set forth in claim 1 wherein said frame mounts are elongated laterally from one frame side to the other frame side.

14. The displaying bumper guard assembly as set forth in claim 13 wherein said frame mounts include a pair of flange members each having a first portion connected to said frame mounts and a second portion releasaby secured to said frame sides when installed.

15. The displaying bumper guard assembly as set forth in claim 1 wherein said frame sides comprise opposite upstanding sides.

16. The displaying bumper guard assembly as set forth in claim 15 wherein said frame sides include a plurality of openings for coupling said frame mounts to said frame at at least two different predetermined vertical locations relative to said first face.

* * * * *